US009317207B2

(12) United States Patent
Hu et al.

(10) Patent No.: US 9,317,207 B2
(45) Date of Patent: Apr. 19, 2016

(54) CACHE MIGRATION (71) Applicant: VMware, Inc., Palo Alto, CA (US)

(72) Inventors: Wenjin Hu, Potsdam, NY (US); Erik Cota-Robles, Mountain View, CA (US)

(73) Assignee: VMWARE, INC., Palo Alto, CA (US)

( * ) Notice: Subject to any disclaimer, the term of this patent is extended or adjusted under 35 U.S.C. 154(b) by 158 days.

(21) Appl. No.: 14/092,703

(22) Filed: Nov. 27, 2013

(65) Prior Publication Data

US 2015/0149729 A1  May 28, 2015

(51) Int. Cl.
*G06F 12/08* (2006.01)
*G06F 3/06* (2006.01)

(52) U.S. Cl.
CPC .............. *G06F 3/0611* (2013.01); *G06F 3/067* (2013.01); *G06F 3/0613* (2013.01); *G06F 3/0647* (2013.01); *G06F 12/0868* (2013.01)

(58) Field of Classification Search
None
See application file for complete search history.

(56) References Cited

U.S. PATENT DOCUMENTS

| | | | |
|---|---|---|---|
| 9,104,529 B1 * | 8/2015 | Derbeko | G06F 12/00 |
| 2012/0059994 A1 * | 3/2012 | Montgomery | G06F 3/0617 711/119 |
| 2014/0013059 A1 * | 1/2014 | Joshi | G06F 12/0815 711/144 |
| 2014/0297780 A1 * | 10/2014 | Zhou | H04L 67/2847 709/216 |

OTHER PUBLICATIONS

Hao et al., A Prediction based CMP Cache Migration Policy, The 10th IEEE International Conference on High Performance Computing and Communications, 2008, pp. 374-381.
Hemsley, Adaptive Shared Cache Migration Policy, OhioLINK Electronic Theses & Dissertations Center, Ohio.gov, 2010, 3 pages.
Megiddo et al., Outperforming LRU with an Adaptive Replacement Cache Algorithm, Published by the IEEE Computer Society, Apr. 2004, 8 pages.
Bansal et al., CAR: Clock with Adaptive Replacement, Proceedings of the Third USENIX Conference on File and Storage Technologies, San Francisco, CA, USA, Mar. 31-Apr. 2, 2004, 15 pages.
Non-Final Office Action for U.S. Appl. No. 14/092,727, mailed Aug. 28, 2015, 13 pages.
Notice of Allowance for U.S. Appl. No. 14/092,727, mailed Dec. 23, 2015, 17 pages.

* cited by examiner

*Primary Examiner* — Gary Portka
(74) *Attorney, Agent, or Firm* — Nicholson De Vos Webster & Elliott LLP (57) ABSTRACT

Exemplary methods, apparatuses, and systems determine that a cache is to be migrated from a first storage device to a second storage device. The cache includes cache entries organized in a first list of cache entries and a second list of cache entries. Only a portion of all cache entries from the first and second lists is selected for migration to the second storage device. The selected cache entries and metadata for cache entries from the first or second list that were not selected are migrated from the first storage device to the second storage device.

20 Claims, 9 Drawing Sheets

CACHE MIGRATION

FIELD OF THE INVENTION

The various embodiments described herein relate to moving cache data from one storage device to another storage device. In particular, embodiments relate to selecting one or more portions of a cache to transfer between storage devices during the migration of a virtual machine.

BACKGROUND OF THE INVENTION

Storage caches are widely used in storage systems for improving input/output (I/O) latency and I/O throughput. In a virtualized environment, these storage caches are configured at a size on the order of gigabytes or terabytes to be large enough to hold most of the corresponding virtual machine (VM) I/O requests. When a VM is migrated from one host to another, however, the handling of such a large a cache is complicated. If the cache is discarded and only the VM is migrated, the VM will suffer a loss of performance following the migration and the large cache will take a long time to repopulate with I/O data. If the whole cache is migrated with VM, the migration time will be prolonged dramatically due to the large size of the cache. Additionally, the network bandwidth will be consistency consumed for an extended period of time when the whole cache is migrated.

SUMMARY OF THE INVENTION

Exemplary methods, apparatuses, and systems determine that a cache is to be migrated from a first storage device to a second storage device. The cache includes cache entries organized in a first list of cache entries and a second list of cache entries. For example, the first list may represent recently used entries while the second list represents frequently used entries. Only a portion of all cache entries from the first and second lists is selected for migration to the second storage device. For example, cache entries may be selected up to a first threshold amount from the first list and up to a second threshold amount from the second list. In one embodiment, the number of cache entries in the first list to be migrated is selected based upon the selected number of cache entries in the second list multiplied by a quotient of the hit rates for the first and second lists. The entries selected from the second list may be selected up to a threshold amount and/or based upon frequency of use once placed in the second list. In one embodiment, cache entries are selected from the second list that have a frequency hit count above a threshold. The selected cache entries and metadata for unselected cache entries are migrated from the first storage device to the second storage device.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein intelligently select a portion of a cache to be migrated from a first storage device to a second storage device. The metadata for unselected entries is migrated along with the selected entries. As a result, the migrated cache has fewer initial misses and thereby provides improved input/output (I/O) latency and throughput without consuming the excess time and bandwidth needed to migrate the entire cache.

Figure 1:
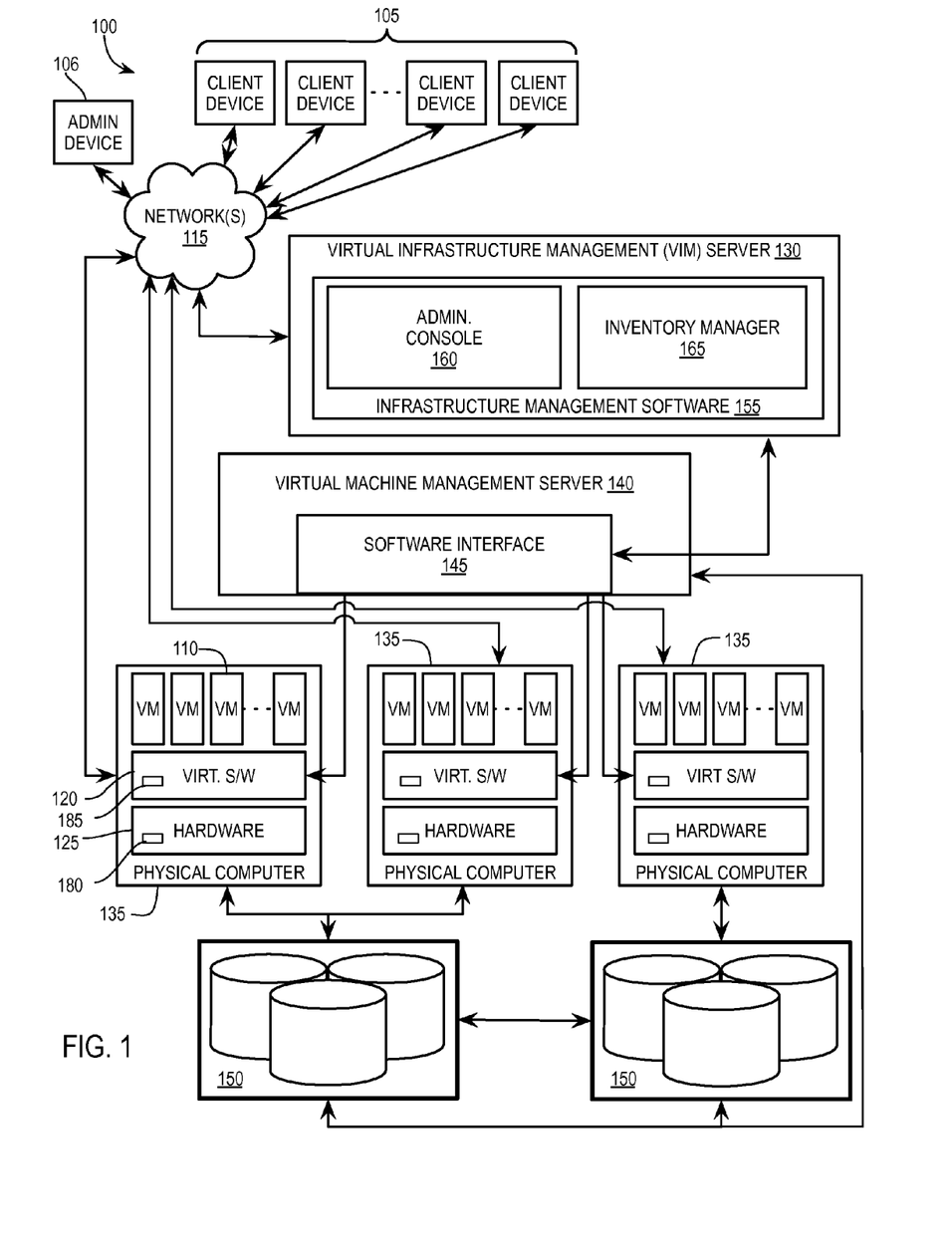
FIG. 1 illustrates, in block diagram form, an exemplary virtual datacenter environment including one or more networked processing devices implementing the selection and migration of cache entries and metadata.

FIG. 1 illustrates, in block diagram form, an exemplary virtual datacenter environment 100 including one or more networked processing devices implementing the selection and migration of cache entries and metadata. Server-based computing in a virtual datacenter environment allows client devices 105 to access centrally-managed user virtual desktops, such as those implemented by VMs 110, via network(s) 115 (e.g., a local area network or other private or publically accessible wide area network, such as the Internet). For example, client device 105 and VM 110 use a desktop remoting protocol such as Remote Desktop Protocol (RDP), Virtual Network Computing (VNC), or Personal Computer over Internet Protocol (PCoIP) to remotely access/provide remote access to a virtual desktop generated by VM 110.

VMs 110 are complete computation environments, containing virtual equivalents of the hardware and system software components of a physical system and are typically implemented by an extensive virtualization infrastructure, which includes a variety of software and hardware components. A virtualization software layer 120 (e.g., a hypervisor) running on hardware 125 of physical computer/host system 135 manages one or more VMs 110. Virtualization software layer 120 manages physical resources, e.g., hardware 125, as well as maintains virtual-to-physical hardware mappings. For example, cache agent 185 runs on or as a part of virtualization software 120 and manages cache 180 as described herein.

In one embodiment, virtual infrastructure management (VIM) server 130 orchestrates the provisioning of software defined datacenter services. Exemplary services include virtualized compute, networking, storage, and security services that implement the infrastructure of virtual datacenter 100. VIM server 130 manages the corresponding VMs 110 through communications with software interface 145 of virtual machine management server (VMMS) 140. VMMS 140 is responsible for provisioning and maintaining the multitude of VMs 110 implemented across one or more physical computers 135 as well as storage 150 utilized by VMs 110.

VIM server 130 may be a physical computer system or a virtual machine that runs infrastructure management software 155. Infrastructure management software 155 within VIM server 130 manages pools of computer resources to run VMs 110 within a cluster of physical computers 135 with central/graphics processing units (CPU's and/or CPU's), memory, and communications hardware. Infrastructure management software 155 includes one or more modules, including administrative console 160 and inventory manager 165.

Each storage device 150 may be a disk array or other collection data stores. For example, each storage device 150 may implement a redundant array of independent disks (RAID) algorithm to combine multiple drive components into a logical unit and divide and/or replicate data among multiple physical drives. In one embodiment, storage device 150 includes a processing device or other storage controller (not shown) and or a cache (in addition to or in place of cache 180).

Administrative console 160 provides a remotely accessible user interface to administrator device 106 to manage the configuration of VMs 110 within the virtual datacenter 100. In one embodiment, administrative console 160 exports a graphical user interface via hypertext transfer protocol (HTTP) to be accessed by a web browser. Alternatively, a command-line interface or a rich client is provided to administrator device 106, which includes a web browser to access the administrative console, Administrative console 160 allows administrator device 106 to configure or define policies for the configuration of cache 180 for use with a VM 110, cache migration polices (as described with reference to the methods illustrated in FIGS. 2-6), and/or caching policies (e.g., write through, write back, caching algorithm, and cache size, e.g., as described with reference to the method illustrated in FIG. 6). Additionally, administrative console 160 allows administrator device 106 to perform a plurality of functions, such as: cloning and migrating VMs 110, defining VM state policies, configuring storage overcommit settings for different data stores 150, performing rebalance operations on a set of virtual desktops, configuring firewall and other networking/security services, adding servers, isolating multi-tenant organizations, creating datacenter service templates, defining role-based access, monitoring processor, memory, and storage usage/allocation, pooling resources, and other similar operations.

Inventory manager 165 handles the events received from VMs 110 and virtualization software 120. For example, a software agent running within a VM 110 or virtualization software 120 may send a notification of a migration event to inventory manager 165. Inventory manager 165 determines a policy that applies to migrating the VM 120 and cache 180 and performs the migration accordingly. Inventory manager 165 may also use timer-based events to schedule effective maintenance and remediation operations.

In general, VMMS 140 provides software interface 145 to enable an administrator or other entity, such as inventory manager 165, to access and manage VMs 110 as described above. Additionally, VMMS 140 supports operations for the discovery of compute, storage, and network resources; creation of logical compute pools by providing features such as automatic CPU and memory load balancing; provisioning/creation of one or more virtual disks, on local or shared storage-clones with full or sparse disks; creation of cloned VMs; and power operations on virtual machines (power on, power-off, suspend, resume, checkpoint, etc.).

While illustrated as separate components, in one embodiment, a single server or other networked processing device implements VIM server 130 and VMMS 140. For example, VIM server 130 and VMMS 140 may be implemented by one or more VMs 110.

Figure 2:
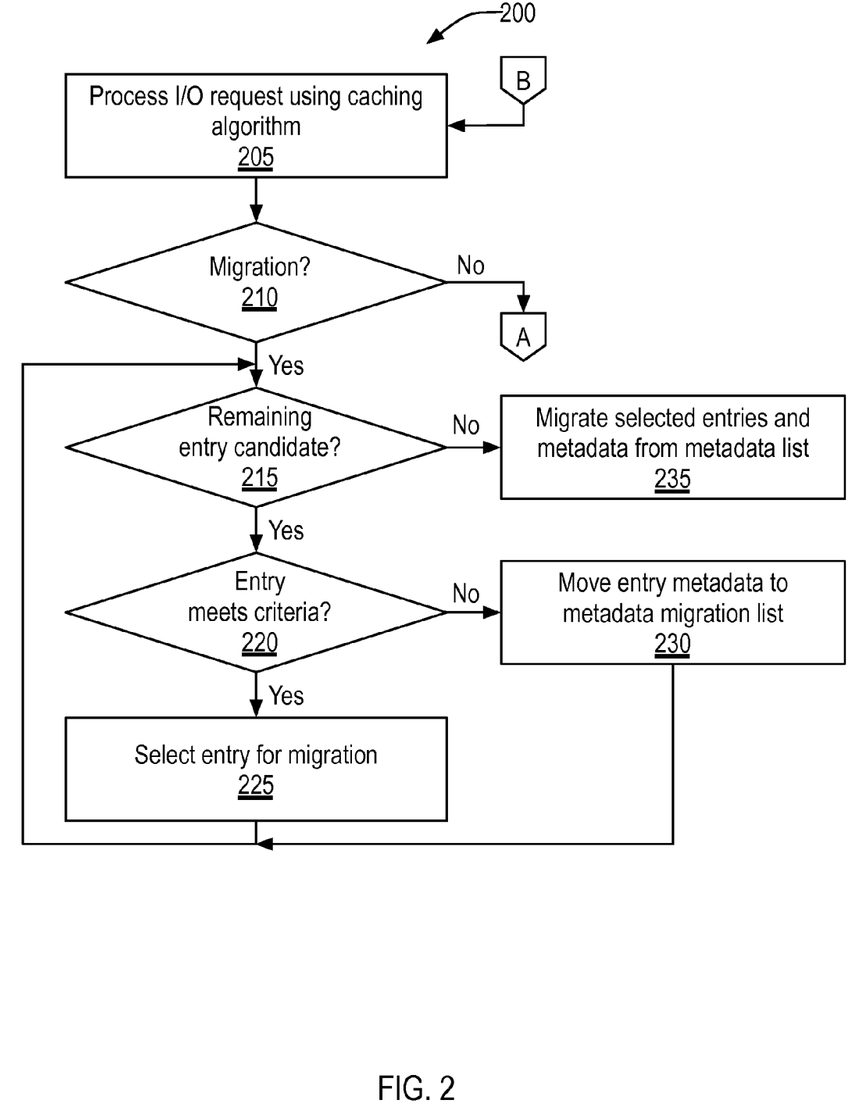
FIG. 2 is a flow chart illustrating an exemplary method of selecting and migrating cache entries and metadata.

FIG. 2 is a flow chart illustrating exemplary method 200 of selecting and migrating cache entries and metadata. The methods set forth herein are described as being performed by cache agent 185. In an alternate embodiment, however, one or more other components, including virtualization software 120, perform all or part of the methods.

At block 205, cache agent 185 processes an I/O request using a caching algorithm. For example, cache agent 185 may manage cache 180 according to adaptive replacement cache (ARC), CLOCK with Adaptive Replacement with Temporal filtering (CART), or another commonly used caching algorithm. Cache agent 185 checks cache 180 for a hit when virtualization software 120 receives an I/O request from a VM 110. Cache entries are added and evicted in response to hits and misses according to the caching algorithm and cache entry metadata is updated accordingly.

For example, ARC maintains two lists of cache entries ordered from most to least recently used entries. The first list, referred to herein as T1, includes entries that have been a part of a single, recent I/O request. The second list, referred to herein as T2, includes entries that have been a part of two or more recent I/O requests. In addition to the entries within T1 and T2, ARC stores metadata for each entry (e.g., a mapping to a location the data is stored in backing storage for the cache). When an entry is evicted from T1 or T2, the metadata for the evicted entry is added to a corresponding history list, referred to as B1 and B2, respectively. B1 and B2 are also maintained from most to least recently used. While B1 and B2 store the metadata and not the underlying data for an evicted entry, the metadata corresponding to an entry evicted from T1 or T2 is referred to herein as an entry in B1 or B2, respectively.

CART also maintains two lists of cache entries, also referred to herein as T1 and T2, and respective metadata lists, B1 and B2. B1 and B2 are maintained in CART in a manner similar to ARC. Unlike ARC, however, T1 and T2 in CART are not ordered from most to least recently used entries. Instead, T1 and T2 entries are organized in circular buffers. Additionally, entries in CART include metadata in the form of a page reference bit and a filter bit. The page reference bit is referred to herein as R. When an entry is first brought into the cache, R is set to zero. On a hit, R for the entry is set to one. The filter bit tracks short-term utility, referred to herein as S, and long-term utility, referred to herein as L. The filter bit is set to S when the corresponding entry is added to the cache (to T1) resulting from a miss in T1, T2, B1, and B2. When an I/O request results in a hit in B1, the filter bit is set to L. Entries are evicted by moving a "clock hand" through the circular buffer. If R is set to zero (and, in T1, the filter bit is set to S), the entry may be evicted (and the metadata is added to B1 or B2, respectively). If the clock hand encounters an entry (in T1 or T2) with R set to one, CART resets R to zero for that entry and proceeds to the next entry. If the clock hand in T1 encounters an entry with the filter bit set to L, the entry is moved to T2. In one embodiment, the CART algorithm is modified as described with reference to FIGS. 6-8.

At block 210, cache agent 185 determines if cache 180 is to be migrated. For example, a management server 130/140 or virtualization software 120 may trigger the migration of VM 110 and cache 180 to another host system 135. If no migration event is detected, cache agent 185 proceeds via off-page connector A to update cache metadata according to one or more of methods 300, 400, and 500 (described below).

If cache agent 185 determines that cache 180 is to be migrated, at block 215, cache agent 185 further determines if cache 180 includes any cache entries to consider for migration. If cache 180 includes a cache entry to consider for migration, at block 220, cache agent 185 determines if the cache entry meets the criteria for migration.

In a first embodiment, cache agent 185 selects up to a first threshold amount of the first list of cache entries (e.g., T1) and up to a second threshold amount of cache entries in the second list of cache entries (e.g., T2). In other words, a cache entry meets the criteria for migration if it is within the threshold amount of entries. The first and second threshold amounts may be the same or different from one another. A threshold amount may be a percentage of a list, a number of entries from a list, a percentage of a list up to a threshold number of entries, an amount of memory used to store entries (e.g., in bytes), etc. For example, for an ARC cache (or another cache that tracks recent use of cache entries), cache agent 185 selects 25% the most recently used entries from T1 and 30% of the most recently used entries from T2. The size of the selected subset of cache entries can be a static/default amount, a user configurable parameter, or determined by cache agent 185 based on the size of cache 180 or the individual lists, T1 and T2.

In a second embodiment, cache agent 185 tracks the overall hit rate for each of the first and second lists, T1 and T2, individually (e.g., as described with reference to FIGS. 3-4). For example, a cache hit in one list counts as a cache miss in the other list. Similar to the embodiment above, cache agent 185 selects up to a predefined/preconfigured threshold amount of cache entries in the second list of cache entries (e.g., a percentage or number of the most recently used entries in T2). The amount of T1 to migrate, however, is determined by the size of the selected subset of T2 and the cache hit rate of T1 and T2. The size of the selected T1 subset is derived by the following adaptive formula: the size of the T2 subset multiplied by T1's cache hit rate divided by T2's cache hit rate. For example, for an ARC cache (or another cache that tracks recent use of cache entries), cache agent 185 selects the most recently used entries from T2 up to a threshold amount and the most recently used entries from T1 up to the result of a threshold defined by adaptive hit rate formula.

In a third embodiment, cache agent 185 maintains a frequency bit for each cache entry in T2 (e.g., as described with reference to FIG. 3). Cache agent 185 sets the frequency bit if an entry in T2 is accessed again subsequent to the access that caused the entry to be added to T2. A cache entry in T2 meets the criteria for migration if the entry's frequency bit is set. Similar to the embodiment above, a cache entry in T1 meets the criteria for migration if it is one of the most recent entries in T1 up to a threshold, e.g., as defined by the result of the adaptive hit rate formula.

In a fourth embodiment, cache agent 185 maintains a frequency counter to track the hit count of each entry stored in T2 or B2. Additionally, cache agent 185 maintains a total entry hit count to track the total number of hits to entries in T2 or B2 (e.g., not including any hits to an entry before it has been added to the T2 list). Cache agent 185 further maintains a multi-hit entry count to track how many entries in T2 or B2 have a frequency count greater than zero. For example, maintenance of frequency counters, the total entry hit count, and the multi-hit entry count is described with reference to FIG. 4. Entries in T2 with a frequency count greater than the total entry hit count divided by the multi-hit entry count (i.e., a frequency count greater than the average T2 hit count for entries that have had a least one hit after being added to T2) meet the criteria for migration. Similar to the embodiment above, a cache entry in T1 meets the criteria for migration if it is one of the most recent entries in T1 up to a threshold, e.g., as defined by the result of the adaptive hit rate formula.

In a fifth embodiment, for a CART cache, cache entries with the filter bit set to L meet the criteria for migration. For example, cache agent 185 selects all or up to a threshold amount of the most recently added entries with the filter bit set to L.

In a sixth embodiment, cache agent 185 maintains frequency counters, the total entry hit count, and the multi-hit entry count for entries of a CART cache with the filter bit set to L. Similar to the fourth embodiment, the frequency counter tracks the hit count of an entry with the filter bit set to L. The total entry hit count tracks the total number of hits to entries that have the filter bit set to L (i.e., but not including any hits to an entry before it's filter bit was set to L or the hit that caused the L bit to be set). The multi-hit entry count tracks how many entries with the filter bit set to L have a frequency count greater than zero. For example, maintenance of frequency counters, the total entry hit count, and the multi-hit entry count is described with reference to FIG. 5. Entries with a frequency count greater than the total entry hit count divided by the multi-hit entry count (i.e., a frequency count greater than the average T2 hit count for entries that have had at least one hit after being added to T2) meet the criteria for migration.

If the current candidate entry meets the criteria, e.g., according to one of the first through sixth embodiments described above, at block 225, cache agent 185 selects the current candidate cache entry for migration. If the current candidate entry does not meet the criteria, at block 230, cache agent 185 optionally moves metadata for the candidate entry to a list of metadata to be migrated. In one embodiment, metadata for unselected candidate entries from T1 and T2 is added to B1 and B2, respectively (e.g., via eviction from T1 and T2). The cache metadata entries stored in one or both of lists B1 and B2 is migrated. For example, if a candidate entry from T1 does not meet the criteria for migration, the metadata for that entry is added to B1 and migrated along with the other entries in B1 and B2. In an alternate embodiment, metadata for the unselected candidate entries from T1 and T2 are added to one or more new lists and these new lists are migrated while the original B1 and B2 lists are not migrated.

After determining whether or not to migrate a given candidate entry, method 200 returns to 215 to determine if any additional candidate cache entries remain. When no additional candidate entries remain, at block 235, cache agent 185 migrates the selected cache entries and, optionally, the list of metadata from the unselected cache entries or otherwise indicates to virtualization software 120 that the selected cache entries and list of metadata from the unselected cache entries is ready for migration.

The embodiments describe above utilize various forms of cache entry metadata. The maintenance of this metadata is described below with reference to FIGS. 3-5. Each of the methods illustrated in FIGS. 3-5 begins with off-page connector A from FIG. 2. As a result, each of the methods illustrated in FIGS. 3-5 may be executed in the alternative to one another or in parallel.

Figure 3:
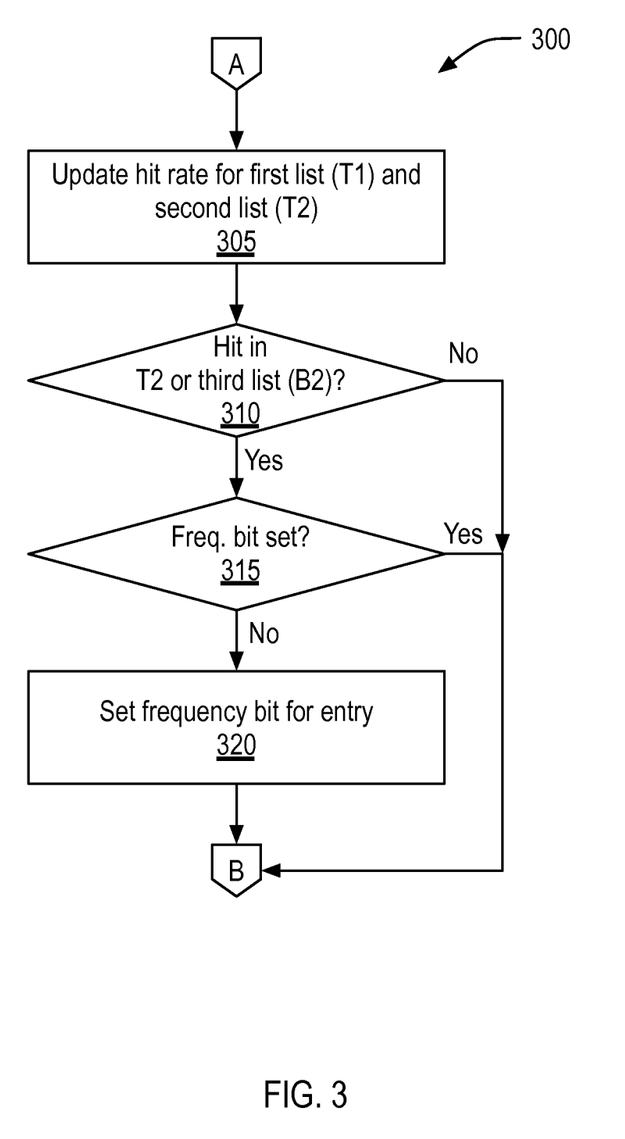
FIG. 3 is a flow chart illustrating an exemplary method of maintaining cache entry metadata used to select cache entries for migration.

FIG. 3 is a flow chart illustrating exemplary method 300 of maintaining cache entry metadata used to select cache entries for migration. At block 305, cache agent 185 updates the hit rate for the first and second lists of cache entries, T1 and T2, in response to the I/O request processed at block 205. For example, when cache agent 185 detects a hit for a cache entry in T1, cache agent 185 increments the hit count for T1 and increments the miss count for T2. Likewise, when cache agent 185 detects a hit for a cache entry in T2, cache agent 185 increments the hit count for T2 and increments the miss count for T1. When cache agent 185 detects a miss for both T1 and T2, cache agent 185 increments the miss counts for both T1 and T2. In one embodiment, cache agent 185 determines the hit rates for T1 and T2 by dividing the respective hit and miss counts.

At block 310, cache agent 185 determines if the I/O request resulted in a hit in T2 or B2. If there was not a hit in T2 or B2, method 300 returns, via off-page connector B, to block 205 to process the next I/O request. If there was a hit in T2 or B2, at block 315, cache agent 185 determines if a frequency bit has previously been set (e.g., to a value of "1") for the cache entry corresponding to the hit in T2 or B2. If the frequency bit was previously set, method 300 returns, via off-page connector B, to block 205 to process the next I/O request. If the frequency bit was not previously set, at block 320, cache agent 185 sets the frequency bit for the corresponding cache entry and method 300 returns, via off-page connector B, to block 205 to process the next I/O request.

Figure 4:
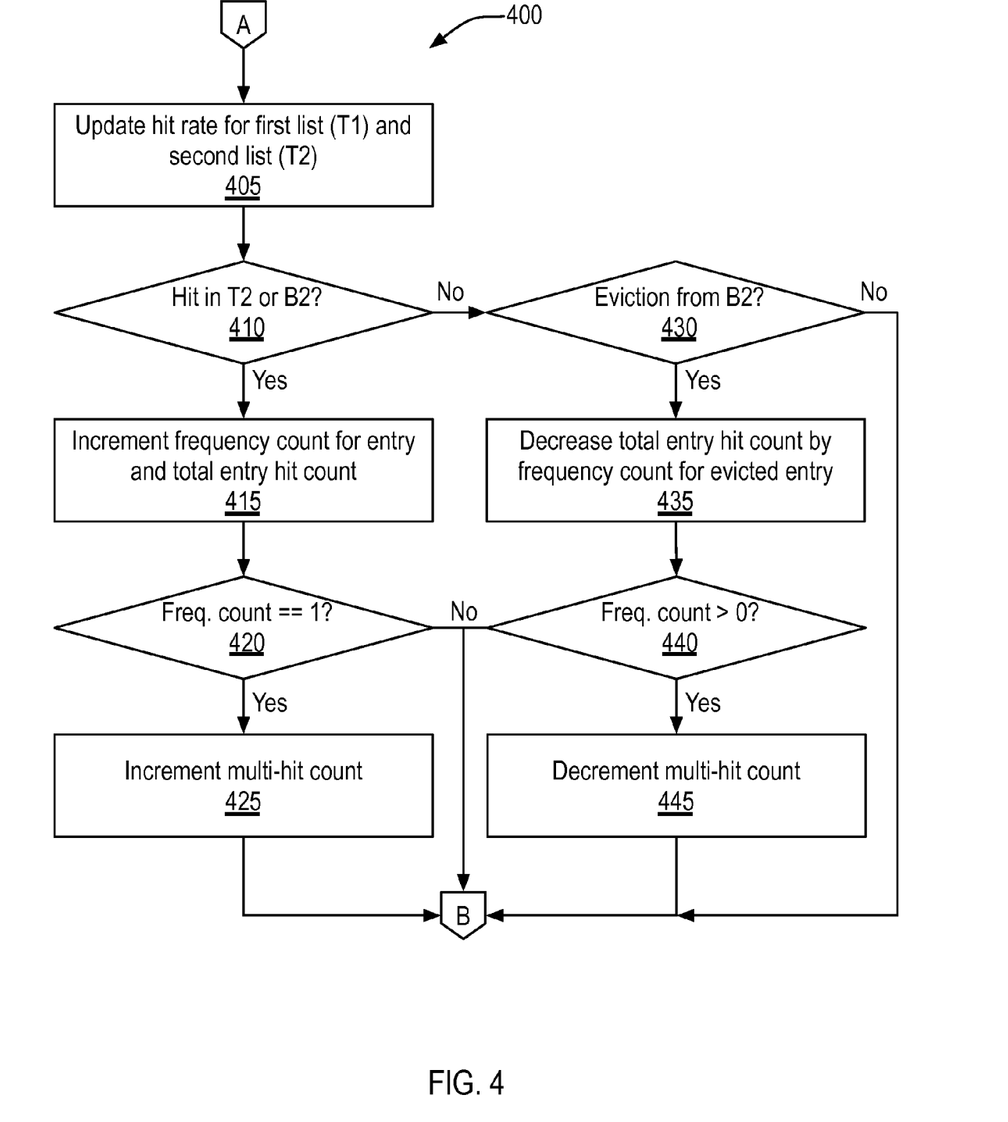
FIG. 4 is a flow chart illustrating another exemplary method of maintaining cache entry metadata used to select cache entries for migration.

FIG. 4 is a flow chart illustrating exemplary method 400 of maintaining cache entry metadata used to select cache entries for migration. Similar to 305 above, at block 405, cache agent 185 updates the hit rate for the first and second lists of cache entries, T1 and T2, in response to the I/O request processed at block 205. At block 410, cache agent 185 determines if the I/O request resulted in a hit in T2 or B2. If there was a hit in T2 or B2, at block 415, cache agent 185 increments a frequency count for the corresponding entry and increments a total entry hit count. As described above, the frequency count for each entry tracks the hit count of each entry stored in T2 and B2 and the total entry hit count tracks the total number of hits to all entries currently in T2 and B2. For example, when an entry is first added to T2, the entry's frequency count is set to zero. The frequency count is incremented for that entry each time there is a hit for that entry while included in T2 or B2.

At block 420, cache agent 185 determines if the frequency count for the corresponding cache entry is equal to one. If the (recently incremented) frequency count for the corresponding cache entry is equal to one, at block 425, cache agent 185 increments a multi-hit count for all entries currently in T2 and B2. As a result, the multi-hit count represents all entries currently in T2 and B2 with a frequency count greater than zero. If the frequency count for the corresponding cache entry is not equal to one, or after incrementing the multi-hit count, method 400 returns, via off-page connector B, to block 205 to process the next I/O request.

If the I/O request did not result in a hit in T2 or B2, at block 430, cache agent 185 determines if processing the I/O request resulted in an eviction from B2. If an entry is evicted from B2, at block 435, cache agent 185 decreases the total hit count by the frequency count for the evicted entry. If an entry is not evicted from B2, method 400 returns, via off-page connector B, to block 205 to process the next I/O request.

At block 440, cache agent 185 determines if the frequency count for the evicted entry is greater than zero. If the frequency count for the evicted entry is greater than zero, at block 445, cache agent 185 decreases the multi-hit count by one. If the frequency count for the evicted entry is not greater than zero, or after decrementing the multi-hit count, method 400 returns, via off-page connector B, to block 205 to process the next I/O request.

Figure 5:
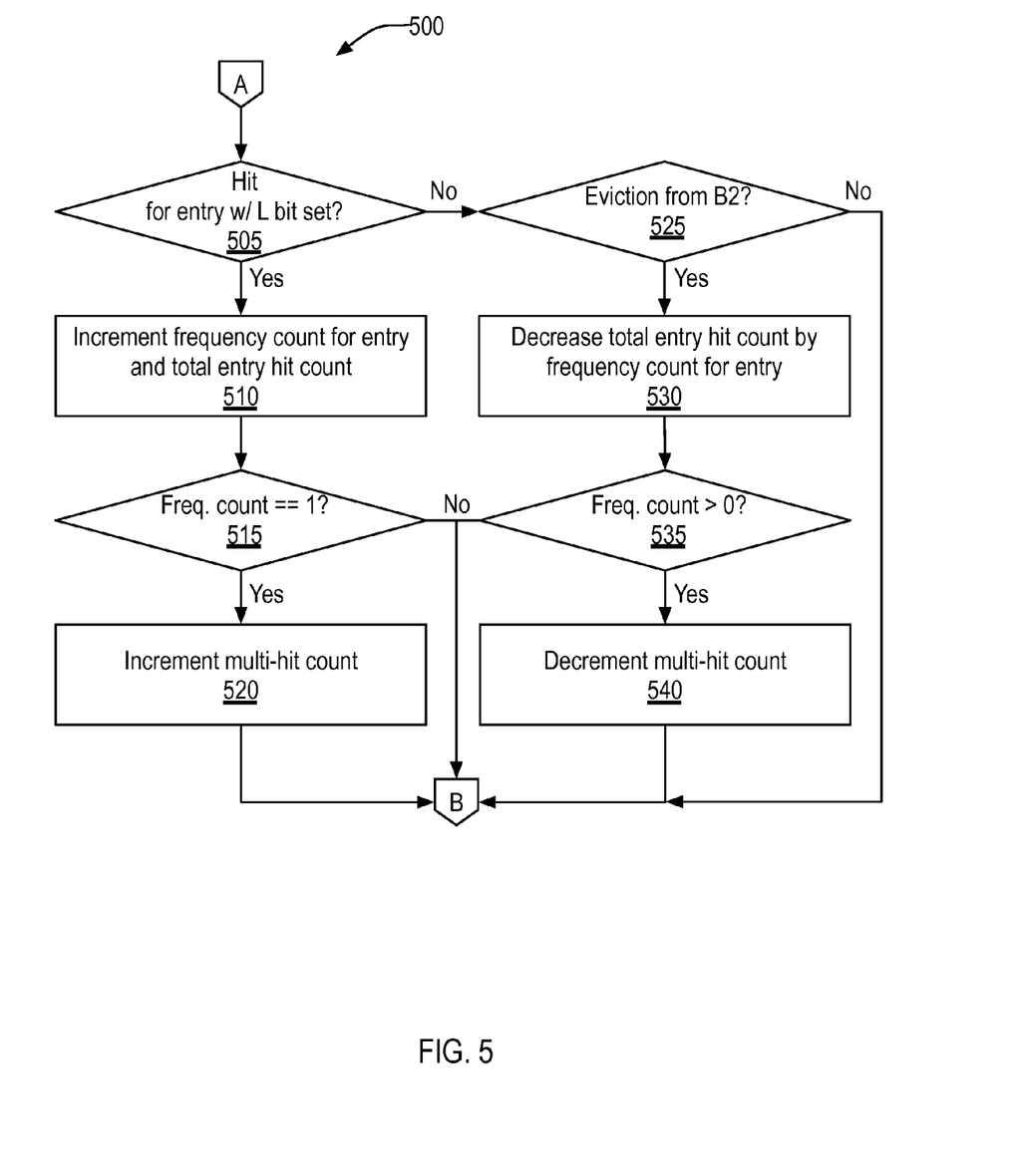
FIG. 5 is a flow chart illustrating another exemplary method of maintaining cache entry metadata used to select cache entries for migration.

FIG. 5 is a flow chart illustrating exemplary method 500 of maintaining cache entry metadata used to select cache entries for migration. At block 505, cache agent 185 determines if the I/O request resulted in a hit for an entry with the filter bit set to L. If there was a hit for an entry with the filter bit set to L, at block 510, cache agent 185 increments a frequency count for the corresponding entry and increments a total entry hit count. Similar to the description above, the frequency count for each entry tracks the hit count of each entry with the filter bit set to L (and after the filter bit is set to L). The total entry hit count tracks the total number of hits to all entries with the filter bit set to L. For example, when an entry's filter bit is first set to L, the entry's frequency count is set to zero. The frequency count is incremented for that entry each time there is a hit for that entry while in the cache.

At block 515, cache agent 185 determines if the frequency count for the corresponding cache entry is equal to one. If the (recently incremented) frequency count for the corresponding cache entry is equal to one, at block 520, cache agent 185 increments a multi-hit count for all entries with the filter bit set to L. As a result, the multi-hit count represents all entries with the filter bit currently set to L and with a frequency count greater than zero. If the frequency count for the corresponding cache entry is not equal to one, or after incrementing the multi-hit count, method 500 returns, via off-page connector B, to block 205 to process the next I/O request.

If the I/O request did not result in a hit for an entry with the filter bit set to L, at block 525, cache agent 185 determines if processing the I/O request resulted in an eviction from B2. If an entry is evicted from B2, at block 530, cache agent 185 decreases the total hit count by the frequency count for the evicted entry. If an entry is not evicted from B2, method 500 returns, via off-page connector B, to block 205 to process the next I/O request.

At block 535, cache agent 185 determines if the frequency count for the evicted entry is greater than zero. If the frequency count for the evicted entry is greater than zero, at block 540, cache agent 185 decreases the multi-hit count by one. If the frequency count for the evicted entry is not greater than zero, or after decrementing the multi-hit count, method 500 returns, via off-page connector B, to block 205 to process the next I/O request.

While methods 200 and 500 facilitate the migration of CART cache entries with a filter bit set to L, a problem arises when the cache is over-provisioned (i.e., larger than the long-term working set size). In such an instance, the CART algorithm may fail to maintain adequate information to determine which entries to keep (i.e., migrate) as opposed to discard (i.e., evict). This occurs because, in the case of an over-provisioned CART cache, the clock does not run very frequently and thus the filter bit for entries is not promoted from S to L in a timely fashion, if at all.

Figure 6:
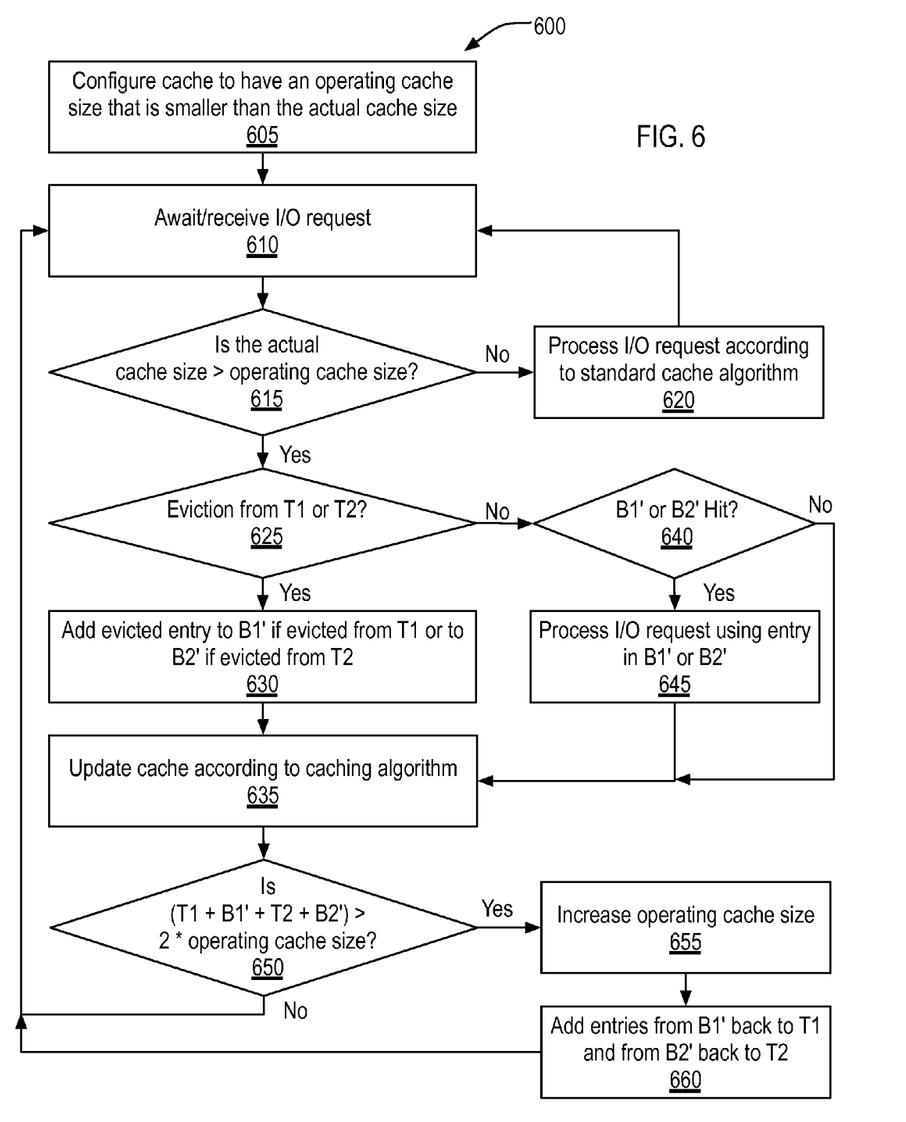
FIG. 6 is a flow chart illustrating an exemplary method of dynamically adjusting the operating cache size.

FIG. 6 is a flow chart illustrating exemplary method 600 of dynamically adjusting the operating cache size. In particular, method 600 applies to adjusting the operating size of a cache managed according to a modified CART algorithm to facilitate the promotion of the filter bit for entries from S to L. At block 605, cache agent 185 configures cache 180 to have an operating cache size that is smaller than the actual cache size. In one embodiment, the operating cache size is a power of two divisor of the actual cache size. Using the operating cache size, the cache is not overprovisioned and entries are more likely to be selected for eviction or have a filter bit promoted from S to L.

At block 610, cache agent 185 awaits and receives an I/O request. At block 615, cache agent 185 determines if the actual cache size is still greater than the operating cache size. If the actual cache size is not greater than the operating cache size, at block 620, cache agent 185 processes the I/O request according to the standard CART algorithm (e.g., by proceeding with method 200 at block 205 and with off-page connector B returning 610 instead of 205).

If the actual cache size is greater than the operating cache size, at block 625, cache agent 185 determines if the I/O request results in an eviction from T1 or T2. If the I/O request results in an eviction from T1 or T2, at block 630, cache agent 185 adds the evicted entry to a modified history list B1' or B2', respectively. Given that the operating size of the cache is less than the actual size, and in contrast to an eviction from T1 or T2 under the standard CART algorithm, the entire evicted entry is added to the corresponding modified history list (i.e., including the data rather than just a metadata entry). At block 635, cache agent 185 otherwise updates the cache according to the CART algorithm. For example, a new entry may be added to T1 or T2 and metadata may be updated as discussed above.

If the I/O request does not result in an eviction from T1 or T2, at block 640, cache agent 185 determines if the I/O request resulted in a hit in B1' or B2'. If the I/O request resulted in a hit in B1' or B2', at block 645, cache agent 185 processes the I/O request using the data stored in the entry in B1' or B2'. As discussed above, both data and metadata are stored in entries in B1' and B2', thereby enabling a hit in B1' or B2' to be serviced by the cache. If the I/O request did not result in a hit in B1' or B2', or after the processing the hit using the data stored in the entry in B1' or B2', method 600 proceeds to block 635 and otherwise updates the cache as described above.

At block 650, cache agent 185 determines if the combination of entries in T1 and B1' and the combination of entries in T2 and B2' is greater than twice the operating cache size. If so, at block 655, cache agent 185 increases the operating cache size. In one embodiment, cache agent 185 doubles the operating cache size (e.g., if doubling the operating cache size results in a new operating cache size that is less than or equal to the actual cache size). Once the operating cache size has been increased, at block 660, cache agent 185 returns the entries in B1' back into T1 and the entries in B2' back into T2. In an alternate embodiment, cache agent 185 increases the operating cache size in response to an entry being evicted or selected to be evicted from B1' or B2'. If the combination of entries in T1, B1', T2, and B2' is less than twice the operating cache size, or after increasing the cache size and returning evicted entries back to T1 and T2, method 600 returns to block 610 to await another I/O request. Alternatively, method 600 proceeds to block 210 of method 200 to determine if a migration event has been triggered and to update other metadata prior to returning to block 610.

Figure 7:
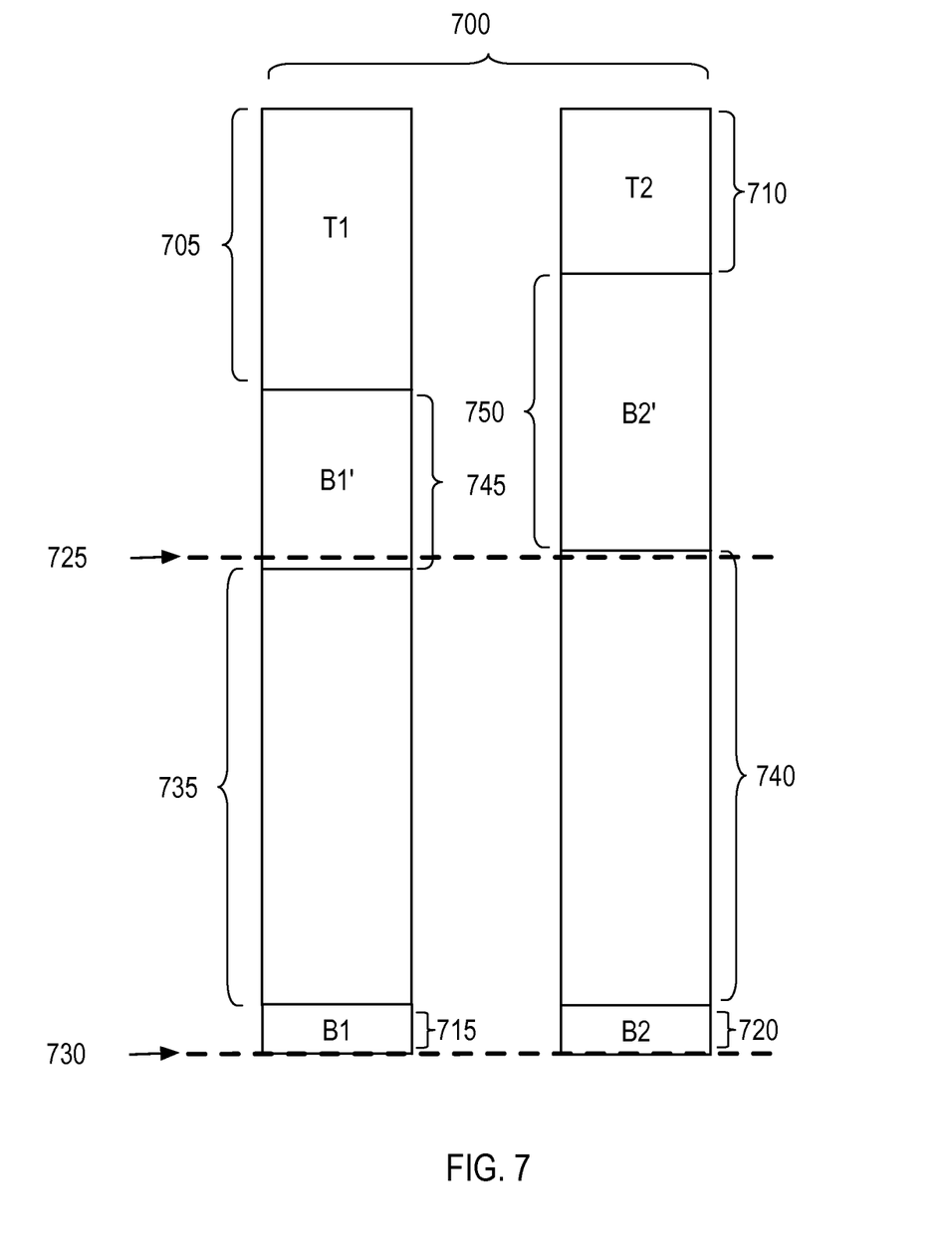
FIG. 7 illustrates a cache prior to dynamically adjusting the operating cache size.

FIG. 7 illustrates exemplary cache 700 prior to dynamically adjusting the operating cache size. Based upon the standard CART algorithm, cache 700 includes two lists of cache entries, T1 705 and T2 710. Additionally, cache 700 includes history lists B1 715 and B2 720. As described above, cache 700 is configured to have operating cache size 725, which is smaller than actual cache size 730. As a result, unused portions 735 and 740 are reserved for a subsequent adjustment of the operating cache size 725. Additionally, cache 700 includes modified history lists, B1' 745 and B2' 750. As entries are added to T1 705, T2 710, B1' 745, and B2' 750, the used portion of the operating size increases. When the combination of T1 705 and B1' 745 or the combination of T2 710 and B2' 750 reaches or exceeds operating size 725 (as illustrated with T1 705 and B1' 745), cache agent 185 increases operating cache size 725 and returns evicted entries from B1' 745 and B2' 750 to T1 705 and T2 710, respectively, as described above.

Figure 8:
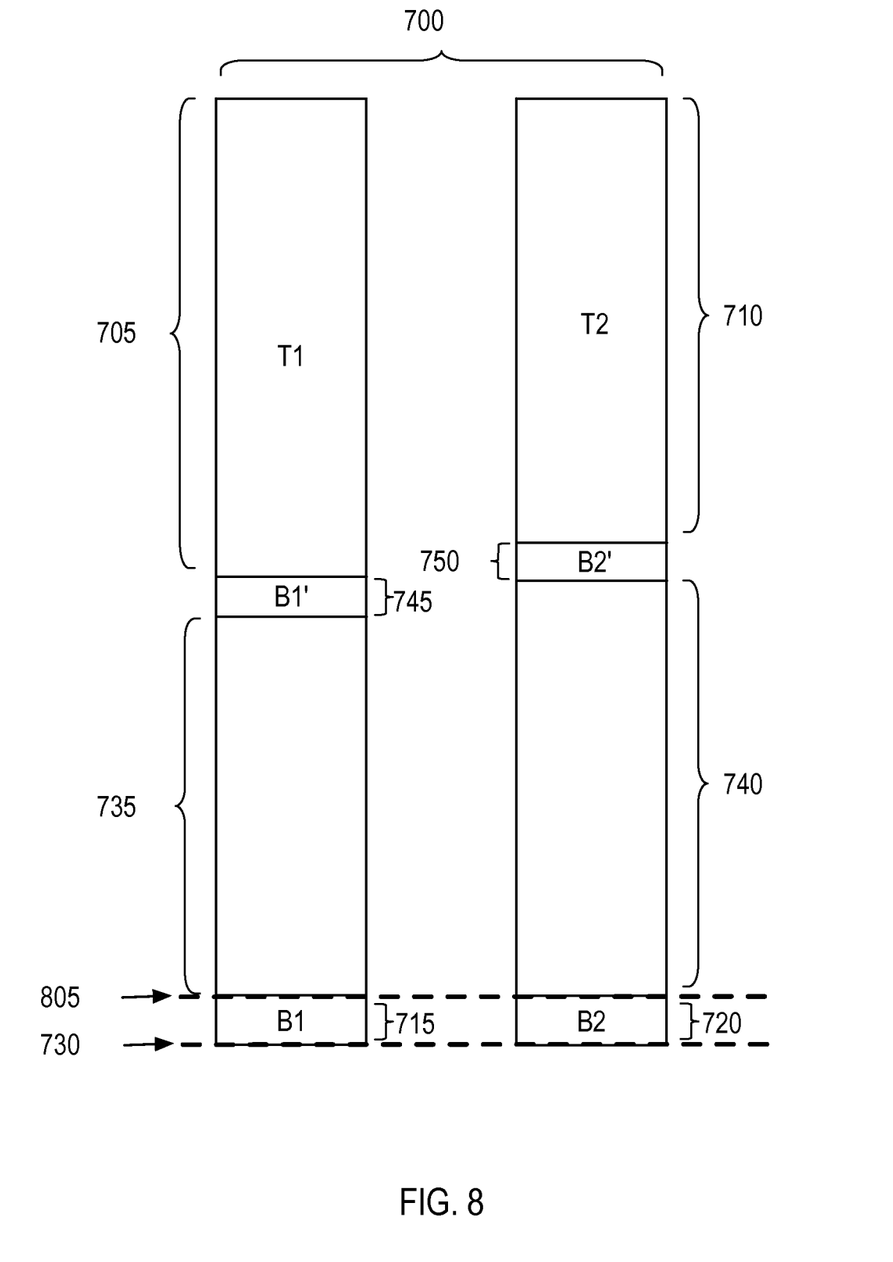
FIG. 8 illustrates the cache of FIG. 7 after dynamically adjusting the operating cache size.

FIG. 8 illustrates exemplary cache 700 after dynamically adjusting operating cache size 725 to new operating cache size 805. T1 705 and T2 710 have increased in size and B1' 745 and B2' 750 have decreased in size due to the return of entries from B1' 745 and B2' 750 back to T1 705 and T2 710.

With new operating cache size 805 being larger than previous operating size 725, T1 705 and B1' 745 are able to collectively grow into unused portion 735 and T2 710 and B2' 750 are able to collectively grow into unused portion 740. As described above, with operating cache size 805 remaining smaller than actual cache size 730, cache 700 continues to operate under the modified algorithm described above with reference to method 600. Should the operating cache size 805 be expanded a number of times, it will eventually reach the limit of actual cache size 730 and cache 700 will return to normal operation under the CART algorithm as described above.

Figure 9:
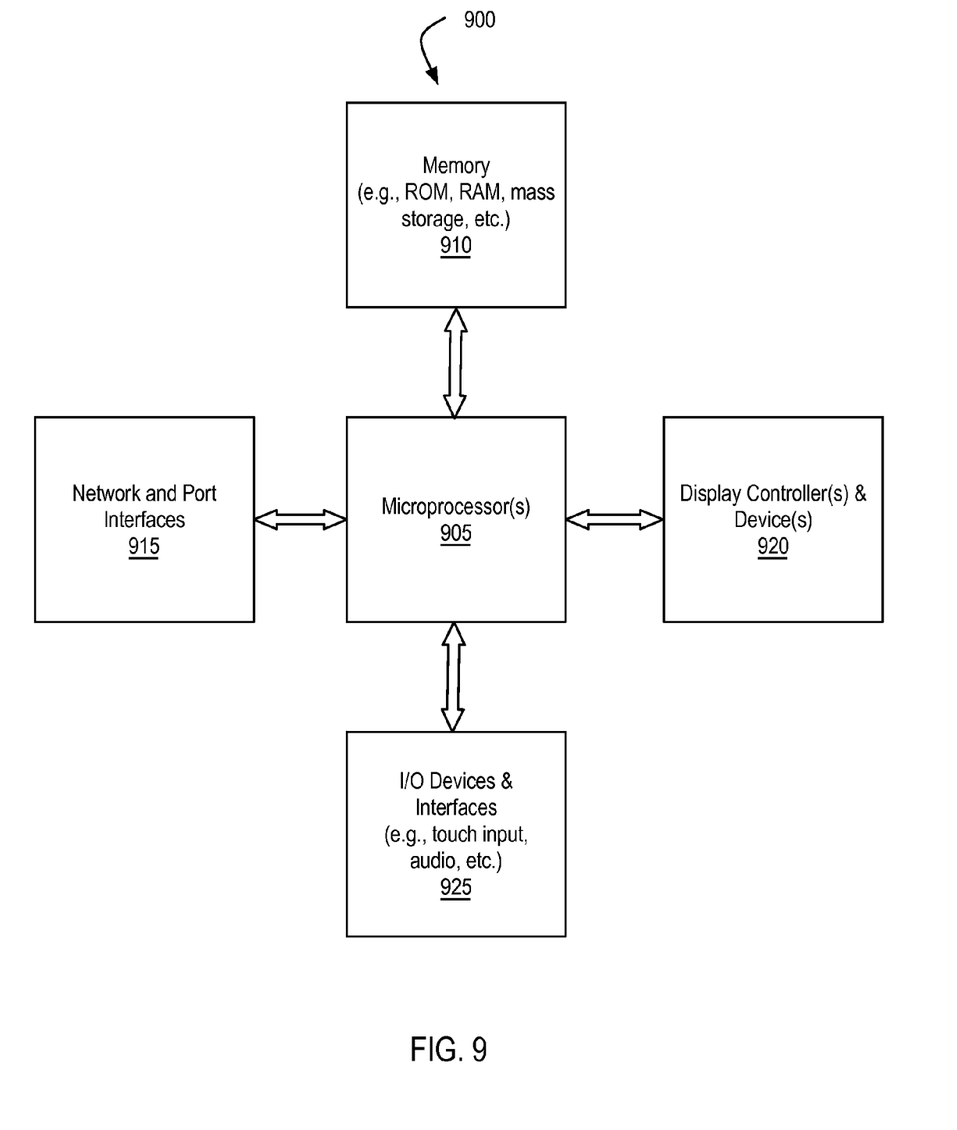
FIG. 9 illustrates, in block diagram form, an exemplary processing system to implement the selection and migration of cache entries and metadata.

FIG. 9 illustrates, in block diagram form, exemplary processing system 900 implement the selection and migration of cache entries and metadata. Data processing system 900 includes one or more microprocessors 905 and connected system components (e.g., multiple connected chips). Alternatively, data processing system 900 is a system on a chip.

Data processing system 900 includes memory 910, which is coupled to microprocessor(s) 905. Memory 910 may be used for storing data, metadata, and programs for execution by the microprocessor(s) 905. Memory 910 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 910 may be internal or distributed memory.

Data processing system 900 includes network and port interfaces 915, such as a port, connector for a dock, or a connector for a USB interface, FireWire, Thunderbolt, Ethernet, Fibre Channel, etc. to connect the system 900 with another device, external component, or a network. Exemplary network and port interfaces 915 also include wireless transceivers, such as an I8 802.11 transceiver, an infrared transceiver, a Bluetooth transceiver, a wireless cellular telephony transceiver (e.g., 2G, 3G, 4G, etc.), or another wireless protocol to connect data processing system 900 with another device, external component, or a network and receive stored instructions, data, tokens, etc.

Data processing system 900 also includes display controller and display device 920 and one or more input or output (I/O) devices and interfaces 925. Display controller and display device 920 provides a visual user interface for the user. I/O devices 925 allow a user to provide input to, receive output from, and otherwise transfer data to and from the system. I/O devices 925 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 9.

Data processing system 900 is an exemplary representation of one or more of client device(s) 105, administrator device 106, VIM server 130, host system(s) 135, VMMS 140, and storage device(s) 150 described above. Data processing system 900 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 900 may be a network computer, server, or an embedded processing device within another device or consumer electronic product. As used herein, the terms computer, device, system, processing system, processing device, and "apparatus comprising a processing device" may be used interchangeably with data processing system 900 and include the above-listed exemplary embodiments.

It will be appreciated that additional components, not shown, may also be part of data processing system 900, and, in certain embodiments, fewer components than that shown in FIG. 9 may also be used in data processing system 900. It will be apparent from this description that aspects of the inventions may be embodied, at least in part, in software. That is, the computer-implemented methods 200, 300, 400, 500, and 600 may be carried out in a computer system or other data processing system 900 in response to its processor or processing system 905 executing sequences of instructions contained in a memory, such as memory 910 or other non-transitory machine-readable storage medium. The software may further be transmitted or received over a network (not shown) via network interface device 915. In various embodiments, hardwired circuitry may be used in combination with the software instructions to implement the present embodiments. Thus, the techniques are not limited to any specific combination of hardware circuitry and software, or to any particular source for the instructions executed by data processing system 900.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Blocks with dashed borders (e.g., large dashes, small dashes, dot-dash, dots) are used herein to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method, comprising:
determining that a cache is to be migrated from a first storage device to a second storage device, wherein the cache includes cache entries organized in a first list of cache entries and a second list of cache entries;
selecting cache entries from each of the first list and the second list to be migrated to the second storage device, wherein only a portion of all cache entries in the first list are selected to be migrated and only a portion of all cache entries in the second list are selected to be migrated; and
migrating, from the first storage device to the second storage device, the selected cache entries and metadata for cache entries from the first or second list that were not selected to be migrated.

2. The computer-implemented method of claim 1, wherein the selecting cache entries includes selecting up to a first threshold amount of the first list and up to a second threshold amount of cache entries in the second list.

3. The computer-implemented method of claim 1, further comprising tracking a hit rate for each of the first and second lists, wherein a number of cache entries in the first list to be migrated is selected based upon a number of cache entries in the second list selected to be migrated multiplied by a quotient of the hit rates for the first and second lists.

4. The computer-implemented method of claim 3, wherein selecting cache entries from the second list includes selecting up to a threshold amount of most recently used cache entries.

5. The computer-implemented method of claim 3, wherein each cache entry includes a frequency indicator that is set if the cache entry is in the second list and is accessed again subsequent to the access that caused the cache entry to be added to the second list, and wherein selecting cache entries from the second list includes selecting entries of second list with the frequency indicator set.

6. The computer-implemented method of claim 3, further comprising:
tracking a frequency hit count of each cache entry in the second list;
tracking a total hit count of a total number of hits of all cache entries currently in the second list; and
tracking a multi-hit count of a number cache entries in the second list that have a frequency hit count that is greater than zero.

7. The computer-implemented method of claim 6, wherein selecting cache entries from the second list includes selecting entries of second list with a frequency hit count that is greater than the total hit count divided by the multi-hit count.

8. The computer-implemented method of claim 1, wherein the cache includes a third list of metadata for cache entries that have been evicted from the cache, wherein the metadata for the cache entries from the first or second list that were not selected are added to the third list in response to not being selected, and wherein the migration of the metadata for cache entries from the first or second list that were not selected comprises:

migrating the third list of metadata for evicted cache entries from the first storage device to the second storage device.

9. A non-transitory computer-readable medium storing instructions, which when executed by a processing device, cause the processing device to perform a method comprising:

determining that a cache is to be migrated from a first storage device to a second storage device, wherein the cache includes cache entries organized in a first list of cache entries and a second list of cache entries;

selecting cache entries from each of the first list and the second list to be migrated to the second storage device, wherein only a portion of all cache entries in the first list are selected to be migrated and only a portion of all cache entries in the second list are selected to be migrated; and     migrating, from the first storage device to the second storage device, the selected cache entries and metadata for cache entries from the first or second list that were not selected to be migrated.

10. The computer-readable medium of claim 9, wherein the selecting cache entries includes selecting up to a first threshold amount of the first list and up to a second threshold amount of cache entries in the second list.

11. The computer-readable medium of claim 9, the method further comprising tracking a hit rate for each of the first and second lists, wherein a number of cache entries in the first list to be migrated is selected based upon a number of cache entries in the second list selected to be migrated multiplied by a quotient of the hit rates for the first and second lists.

12. The computer-readable medium of claim 11, wherein selecting cache entries from the second list includes selecting up to a threshold amount of most recently used cache entries.

13. The computer-readable medium of claim 11, wherein each cache entry includes a frequency indicator that is set if the cache entry is in the second list and is accessed again subsequent to the access that caused the cache entry to be added to the second list, and wherein selecting cache entries from the second list includes selecting entries of second list with the frequency indicator set.

14. The computer-readable medium of claim 11, the method further comprising:

tracking a frequency hit count of each cache entry in the second list;

tracking a total hit count of a total number of hits of all cache entries currently in the second list; and     tracking a multi-hit count of a number cache entries in the second list that have a frequency hit count that is greater than zero.

15. The computer-readable medium of claim 14, wherein selecting cache entries from the second list includes selecting entries of second list with a frequency hit count that is greater than the total hit count divided by the multi-hit count.

16. The computer-readable medium of claim 9, wherein the cache includes a third list of metadata for cache entries that have been evicted from the cache, wherein the metadata for the cache entries from the first or second list that were not selected are added to the third list in response to not being selected, and wherein the migration of the metadata for cache entries from the first or second list that were not selected comprises:

migrating the third list of metadata for evicted cache entries from the first storage device to the second storage device.

17. An apparatus comprising:

a processing device, wherein the processing device executes instructions that cause the apparatus to perform a method comprising:

determining that a cache is to be migrated from a first storage device to a second storage device, wherein the cache includes cache entries organized in a first list of cache entries and a second list of cache entries;

selecting cache entries from each of the first list and the second list to be migrated to the second storage device, wherein only a portion of all cache entries in the first list are selected to be migrated and only a portion of all cache entries in the second list are selected to be migrated; and         migrating, from the first storage device to the second storage device, the selected cache entries and metadata for cache entries from the first or second list that were not selected to be migrated.

18. The apparatus of claim 17, the method further comprising:

tracking a hit rate for each of the first and second lists, wherein a number of cache entries in the first list to be migrated is selected based upon a number of cache entries in the second list selected to be migrated multiplied by a quotient of the hit rates for the first and second lists.

19. The apparatus of claim 18, wherein each cache entry includes a frequency indicator that is set if the cache entry is in the second list and is accessed again subsequent to the access that caused the cache entry to be added to the second list, and wherein selecting cache entries from the second list includes selecting entries of second list with the frequency indicator set.

20. The apparatus of claim 18, the method further comprising:

tracking a frequency hit count of each cache entry in the second list;

tracking a total hit count of a total number of hits of all cache entries currently in the second list; and     tracking a multi-hit count of a number cache entries in the second list that have a frequency hit count that is greater than zero, wherein selecting cache entries from the second list includes selecting entries of second list with a frequency hit count that is greater than the total hit count divided by the multi-hit count.

\* \* \* \* \*